June 13, 1950 J. KRAFCZYK 2,511,592
FISH SCALING EQUIPMENT
Filed April 10, 1946

INVENTOR
JOHN KRAFCZYK
BY Wheeler, Wheeler & Wheeler
ATTORNEYS

Patented June 13, 1950

2,511,592

UNITED STATES PATENT OFFICE 2,511,592

FISH-SCALING EQUIPMENT

John Krafczyk, Wauwatosa, Wis.

Application April 10, 1946, Serial No. 660,953

1 Claim. (Cl. 17—8)

My invention relates to improvements in fish scaling equipment.

My object is to provide means for quickly and securely clamping a fish to a scaling board, and as quickly releasing it for reversing its position or upon completion of the scaling operation.

In the drawings.

Like parts are identified by the same reference characters in both views.

Figure 1:
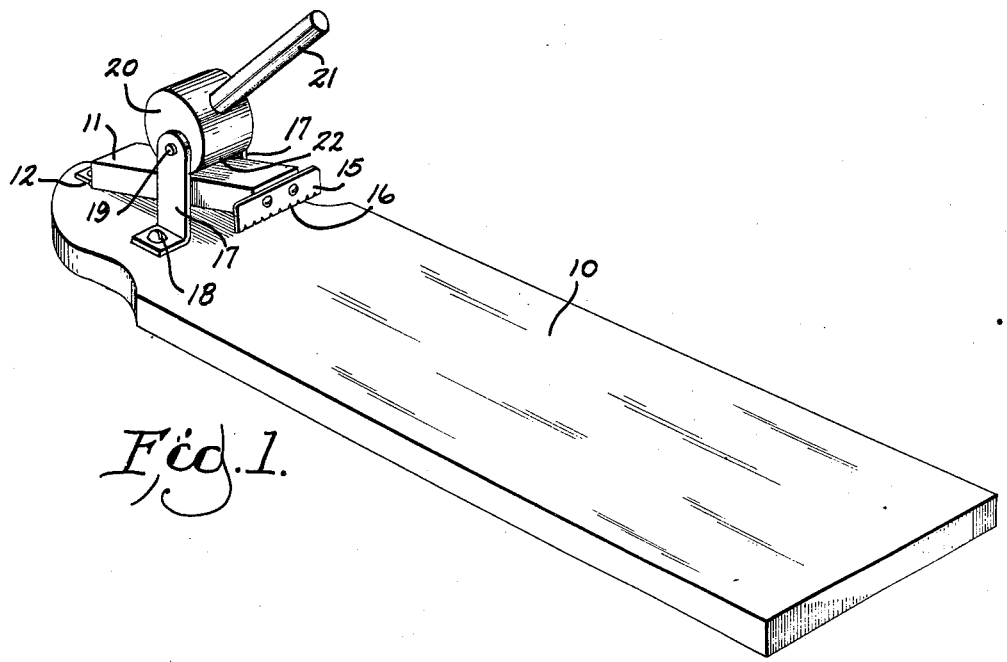
Figure 1 is a perspective view of scaling equipment embodying my invention in its preferred form.
Figure 2:
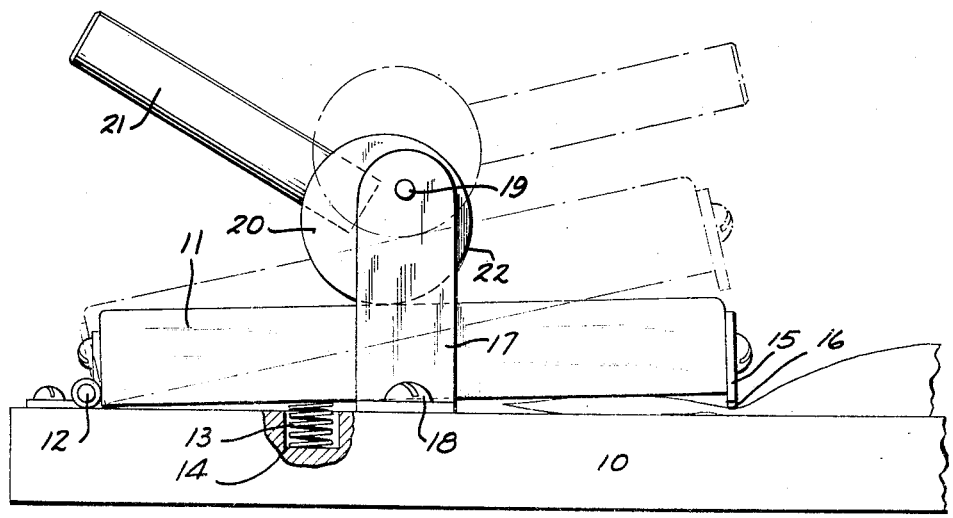
Figure 2 is an enlarged side elevation of the clamping portion of said equipment, showing the same in clamping relation to the tail of a fish, with dotted lines indicating the released position and with a portion of the board broken away to disclose the releasing spring.

A scaling board 10 has a clamping plate 11 hinged thereto at 12 near one margin of the board. The plate 11 is normally held in an inclined raised position by a spring interposed between the board and plate. A coiled compression spring 13, seated in a socket 14 in the board 10, with its upper end bearing upon an intermediate portion of the plate, may be used for this purpose. The margin of the plate 11 distant from the hinge 12 is provided with a depending fish engaging member or jaw 15, preferably having a serrated lower edge 16, the teeth of which readily penetrate the tail of a fish when clamped thereto.

The plate 11 is flanked on both sides by brackets 17 secured to the board at 18 and connected above the plate 11 by a pivot rod 19 upon which a clamp actuating member 20 is fixedly mounted. The member 20 has an operating handle 21 and an arcuate bearing surface 22 eccentric to its pivotal axis, and in bearing contact with the plate 11 to limit the upward movement of the latter under the urge of the spring 14. Normally the curved eccentric surface 22 has a relatively short radius in bearing contact with the plate 11, the eccentric occupying substantially the position in which it is shown in Figure 1. But when the handle 21 is swung to the left from its Figure 1 position other radii of the member 20 are progressively brought into contact with the plate 11, and if the tail of a fish has been interposed between the board 10 and the gripping jaw, it may be clamped upon the tail of a fish to securely hold the fish to the board during a scaling operation. By swinging the handle 21 in the opposite direction, the fish can be released, readjusted, and again clamped pending removal of the scales from another surface. It will be noted that whenever the handle is swung in one direction to present a shorter radius of the eccentric to the plate 11, the latter will be lifted by the spring and will follow the eccentric in a continuous bearing contact therewith. Therefore fish may be quickly scaled and other fish substituted and securely held without any further attention, the operator being able to give his entire attention to the scale removing tool.

I claim:

The combination with a fish scaling board of sufficient length to receive a fish to be scaled, said board providing fixed support for such fish, of a pair of ears upstanding adjacent one end of the board and fixedly connected therewith, a clamping member disposed between the ears and extending longitudinally of the board, said member having a hinge connecting it with the end of the board nearest the ears, the free end of said member being vertically movable respecting the board, and an intermediate portion of such member being vertically movable between the ears, a compression spring confined between the board and the member, one of which has a recess receiving said spring and from which said spring projects to engage the other, said spring biasing said member upwardly upon its hinge, a pintle extending transversely above said member between said ears, an eccentric pivoted upon the pintle and bearing upon said member and provided with a radially projecting handle for its operation, said member being provided at its free end with serrations comprising teeth for clamping engagement with a fish extending away from said member along said board and supported on the board.

JOHN KRAFCZYK.

REFERENCES CITED

The following references are of record in the file of this patent:

UNITED STATES PATENTS

| Number | Name | Date |
|---|---|---|
| 435,887 | Ellithorp | Sept. 2, 1890 |
| 586,359 | Holt | July 13, 1897 |
| 926,582 | Meredith | June 29, 1909 |
| 1,259,109 | Kugler et al. | Mar. 12, 1918 |
| 2,390,997 | Fuller | Dec. 18, 1945 |